(12) United States Patent
White et al.

(10) Patent No.: US 10,339,024 B2
(45) Date of Patent: Jul. 2, 2019

(54) PASSIVE DEVICE DETECTION

(71) Applicant: Microsoft Technology Licensing, LLC, Redmond, WA (US)

(72) Inventors: Gus H. White, Sammamish, WA (US); Yuqun Cao, Bellevue, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 299 days.

(21) Appl. No.: 15/408,138

(22) Filed: Jan. 17, 2017

(65) Prior Publication Data
US 2018/0203782 A1 Jul. 19, 2018

(51) Int. Cl.
*G06F 11/30* (2006.01)
*G06F 11/34* (2006.01)
*G06F 3/16* (2006.01)

(52) U.S. Cl.
CPC ...... *G06F 11/3041* (2013.01); *G06F 11/3051* (2013.01); *G06F 11/3438* (2013.01); *G06F 3/162* (2013.01)

(58) Field of Classification Search
CPC .. G06F 3/162; G06F 11/3041; G06F 11/3051; G06F 11/3055; G06F 11/3438; G06F 13/10; G06F 13/102
See application file for complete search history.

(56) References Cited

U.S. PATENT DOCUMENTS

| | | | |
|---|---|---|---|
| 6,069,960 A | 5/2000 | Mizukami et al. | |
| 6,594,366 B1 | 7/2003 | Adams | |
| 6,856,046 B1 | 2/2005 | Scarlett et al. | |
| 7,349,546 B2* | 3/2008 | Ganton | H04R 5/04 379/430 |
| 7,836,216 B2* | 11/2010 | Kashi | H01R 24/58 381/74 |
| 8,565,444 B2 | 10/2013 | Johnson | |
| 8,787,597 B2 | 7/2014 | Ranganathan et al. | |
| 8,914,552 B2 | 12/2014 | Chadbourne et al. | |
| 2001/0053227 A1 | 12/2001 | Narasimhan | |
| 2004/0080440 A1 | 4/2004 | Su et al. | |
| 2005/0201568 A1 | 9/2005 | Goyal | |
| 2009/0225062 A1* | 9/2009 | Naik | G06F 1/3203 345/204 |
| 2013/0158921 A1 | 6/2013 | Shah et al. | |
| 2014/0003616 A1* | 1/2014 | Johnson | H04R 29/001 381/74 |

(Continued)

OTHER PUBLICATIONS

Gan, et al., "An Integrated Audio and Active Noise Control Headsets", In Journal of IEEE Transactions on Consumer Electronics, vol. 48, Issue 2, May 2002, pp. 242-247.

(Continued)

*Primary Examiner* — Thomas J Cleary
(74) *Attorney, Agent, or Firm* — Holzer Patel Drennan

(57) ABSTRACT

A system for passive device identification includes a passive device communicatively coupled to a processing device. The processing device includes a passive device identifier configured to a current supplied to the passive electronic device at discrete intervals and to sample a voltage of the passive electronic device at each one of the discrete intervals to generate a dataset of current-voltage pairs. The passive define identifier is further configured to identify the passive electronic device based on the generated dataset.

20 Claims, 4 Drawing Sheets

(56) References Cited

U.S. PATENT DOCUMENTS

| | | | |
|---|---|---|---|
| 2014/0010381 A1* | 1/2014 | Doy | H04R 29/00 |
| | | | 381/59 |
| 2015/0233859 A1* | 8/2015 | Zhu | H04R 5/04 |
| | | | 324/672 |
| 2017/0245072 A1* | 8/2017 | Agarwal | H03M 1/46 |

OTHER PUBLICATIONS

"Ambient Noise-Cancellation for Headphones and Handsets", https://www.cirrus.com/en/pubs/whitePaper/WP_Ambient_noise_cancellation_for_headphones_and_handsets.pdf, Published on: Aug. 2010, pp. 1-12.

"Simple linear regression", https://en.wikipedia.org/wiki/Simple_linear_regression, Retrieved on: Dec. 2, 2016, 2 pages.

* cited by examiner

PASSIVE DEVICE DETECTION

BACKGROUND

The term "passive electronic device" is generally used to refer to an electronic device incapable of producing energy in the form of voltage or current. Some passive electronic devices act as computing accessories that plug into and receive energy from a host, such as a pair of headphones or a microphone. Utility of a passive electronic device may depend, in part, on the ability of a host device to identify the specific type of passive electronic device to which it is connected. For example, a host supplying power to an audio headset may implement different gain adjustments for different types of headsets where each gain adjustment is specifically tuned to maximize the user experience for a specific headset.

SUMMARY

Implementations described and claimed herein provide techniques for identification of a passive electronic device coupled to an active processing device. According to one implementation, a system for passive electronic device identification includes a passive device identifier configured to increment a current supplied to the passive electronic device at discrete intervals and to sample a voltage of the passive electronic device at each one of the discrete intervals. The passive electronic device identifier is further configured to identify the passive electronic device based on the generated dataset.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Other implementations are also described and recited herein.

DETAILED DESCRIPTION

Since different devices offer varying levels of impedance, measuring device impedance is one way to determine what type of passive electronic device is connected to a host. In some cases, impedance can be measured in a passive electronic device by supplying current, sampling a voltage, and solving for the impedance using Ohm's law. However, this technique is insufficient in some passive devices, such as passive headsets, that may self-generate current that reduces accuracy of the measurement. For example, passive headsets may include one or more coils positioned in the field of a magnet that can self-induce a current when ambient sound in the room causes movement of the coils. This self-induced current acts as "noise" that may ultimately cause a host device to misidentify a passive electronic device. This misidentification may, in turn, cause the host to inaccurately adjust signals traveling to and from the passive electronic device. When, for example, a host device inaccurately identifies a type of headphones attached to an audio port, the host may deliver an audio stream according to incorrect settings intended for a different type of device and/or user experience, leading to a distortion in intended volume and/or sound.

The herein disclosed technology provides systems and methods for passive device identification that can be performed quickly while guaranteeing a high level of accuracy and without disrupting a user experience. In one implementation, current is provided to a passive electronic device and is ramped up at discrete intervals. Voltage across is iteratively sampled along a channel of the passive electronic device during the ramp at each one of the current intervals. Impedance of the passive electronic device is calculated based on the collected voltage measurements, and an identity of the passive electronic device is determined based on the impedance calculation.

The above-described method of passive device identification is, in at least one implementation, performed using a least linear squares technique that computes running summations to allow for quick, iterative confidence estimates in accuracy after sampling each data point. These confidence estimates are usable to effectively limit the number of samples collected (e.g., the number of discrete intervals in the current ramp) by the amount of error detected in the resulting dataset. This reduces time and overhead associated with the identification of the process.

When this method is utilized in passive headset detection, further benefits are derived from the effect of "ramping" up current, which effectively prevents the user from hearing an audible "pop" during the measurement process.

Figure 1:
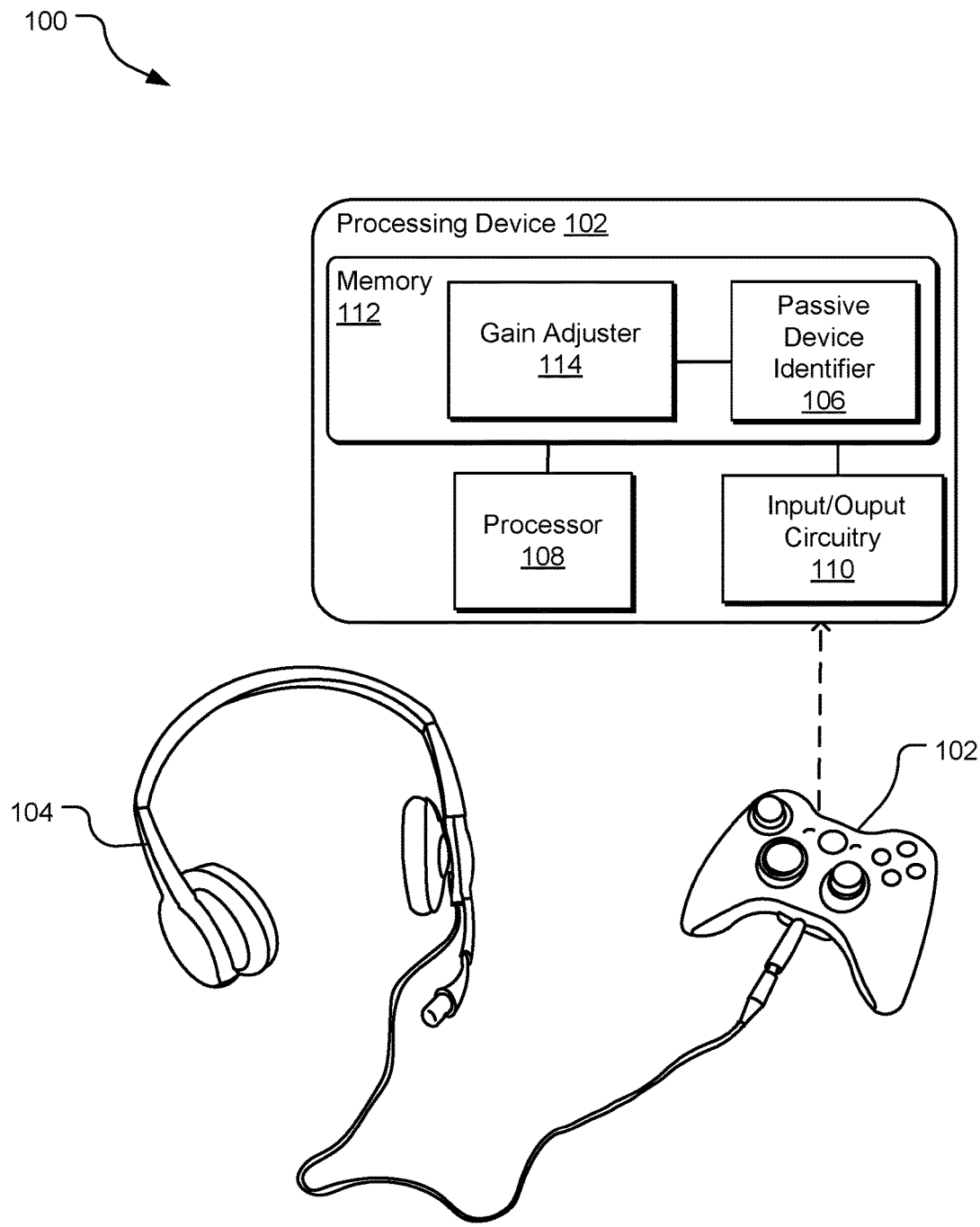
FIG. 1 illustrates an example system for passive device detection.

FIG. 1 illustrates an example system 100 for passive device detection. The system 100 includes a processing device 102 and a passive electronic device 104. The processing device 102 is an active device capable of supplying a current to the passive electronic device 104. In FIG. 1, the passive electronic device 104 is shown to be a headset and the processing device 102 is shown to be a gaming controller. In other implementations, the processing device 102 and the passive electronic device 104 may assume a variety of different forms. For example, the processing device 102 may be a desktop computer, laptop computer, smart phone, smart watch, set-top box, gaming console, etc., while the passive electronic device 104 may be any type of passive device capable of electrically coupling to the processing device 102, such as a headset, microphone, etc.

The processing device 102 includes at least a processor 108, memory 112, and a number of applications including a passive device identifier 106 and a gain adjuster 114 that are stored in the memory 112 and executable by the processor 108 to manage input/output circuitry 110 of the processing device 102, provide for identification of the passive electronic device 104, and to adjust outgoing signals based on the identification.

According to one implementation, the processor 108 executes the passive device identifier 106 to control the input/output circuitry 110 to incrementally ramp up a current provided to the passive electronic device 104 and to sample a voltage of the passive electronic device responsive to each increment in the current. A data array is generated of the form $(I_i, V_i)$ where I represents the current, V represents the sampled analog voltage (or a count from an analog-to-digital converter that is linearly proportional to analog voltage), and i represents the numerical index of the data point. A line is fitted to the dataset, such that a slope of the line is equal or generally proportional to the impedance in the passive electronic device 104.

The passive device identifier 106 calculates the impedance (e.g., total observed resistance) in the passive electronic device 104 based on the measured slope and compares the result to impedance values saved in the memory 112 and stored in association with a plurality of different passive electronic devices. For example, the passive device identifier 106 may calculate an impedance value of 598 Ohms and compare this to impedance values saved in association with different types of dual-channel stereo headsets and/or mono headsets to identify which type of headset is currently connected to the processing device 102.

Responsive to identification of the passive electronic device 104 by the passive device identifier 106, the gain adjuster 114 then adjusts gain of the passive electronic device based on the identification.

In one implementation, the passive device identifier 106 uses a least squares linear regression method to iteratively compute the slope of the line given by the dataset $(I_i, V_i)$ and to calculate a confidence estimate at each iteration. For example, the passive device identifier 106 may, after sampling each voltage value (Vi), calculate a standard deviation (sigma) in the determined slope and use the computed standard deviation and the computed slope to determine whether the current dataset provides a threshold level confidence in the calculated slope. If the passive device identifier 106 determines the dataset is sufficient to provide the threshold level of confidence, no further voltages are sampled. If, to the contrary, the passive device identifier 106 determines that the dataset is not sufficient to provide the threshold level of confidence, the dataset is expanded by further iterations of the above (e.g., the current is incremented, the voltage is sampled at the incremented current level, and the confidence estimate is repeated until the threshold confidence level is deemed satisfied).

In the above-described approach, the iterative confidence estimates are feasible, in part, due to low overhead that is associated with running summations utilized in the least linear squares regression methodology.

In another implementation, the passive device identifier 106 does not use a least squares linear regression methodology. Rather, the sampled voltages are passed through a low-pass filter to eliminate data points indicative of a high level of noise. Impedance is calculated for each isolated point in the filtered dataset, and the calculated impedance values are averaged. This method provides a high level of accuracy, but may be more time-consuming to implement than the above-described least linear squares regression approach due to the inability to use running summations (e.g., as in the least linear squares regression) to leverage computation time and/or limit a total number of data points collected.

Figure 2:
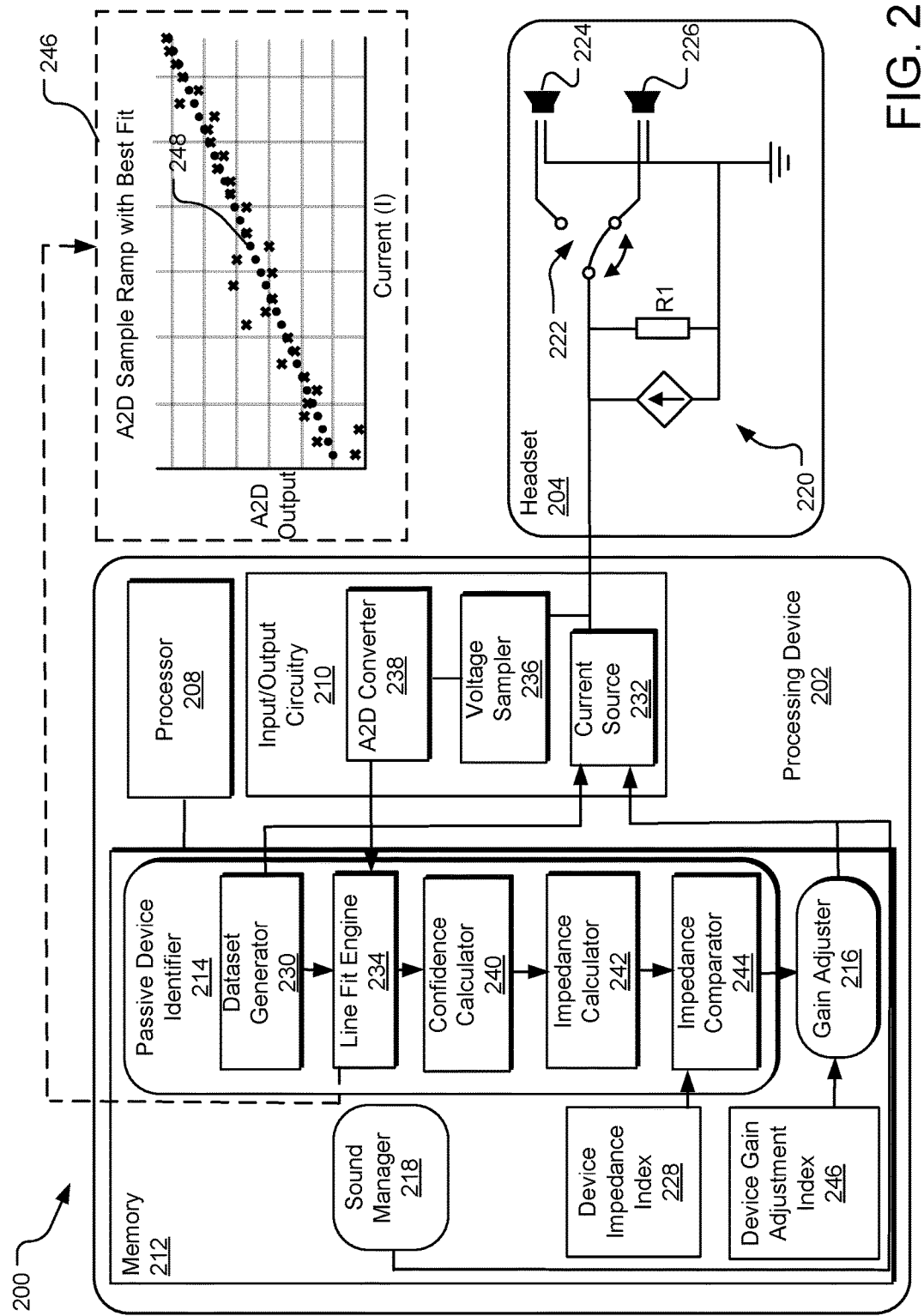
FIG. 2 illustrates another example system for passive device detection.

FIG. 2 illustrates another example system 200 for passive device detection. The system 200 includes a processing device 202 and a headset 204. The processing device 202 includes at least a processor 208 (e.g., a processor, system on chip (SoC), or microprocessor), memory 212, and a number of applications that are stored in the memory 212 and executable by the processor 208 to control input/output circuitry 210 and perform various functions with respect to the headset 204.

Example applications shown in the memory 212 include a passive device identifier 214, a gain adjuster 216, and a sound manager 218. The passive device identifier 214 represents processor-executable instructions for sampling voltage of the headset 204 at various current input levels and for analyzing the sampled voltages and corresponding current levels to identify the headset 204. The gain adjuster 216 represents processor-executable instructions for adjusting gain (volume) to the headset 204 based on the identification, while the sound manager 218 represents computer-executable instructions for managing general aspects of audio stream delivery to the headset 204.

The headset 204 is illustrated by an exemplary circuit 220 illustrating components subject to variation in different implementations. In FIG. 2, the exemplary circuit 220 is a parallel circuit including a first resistor (R1) and a mechanism (e.g., a switch 222) for supplying current to either a left channel 224 or a right channel 226 of the headset 204. The switch 222 may be, for example, a dual-pole single throw switch (SPDT) or a multiplexor configured to switch a current source 232 to the left channel 224 or the right channel 226. According to one implementation, the passive device identifier 214 performs operations for determining impedance in each of the left channel 224 and the right channel 226. The determined impedance values are compared to values stored in a device impedance index 228 that are each further associated in the memory 212 with a particular type of passive electronic device. As a result of this association, the above-described comparison facilitates identification of the headset 204.

Functionality of the passive device identifier 214 is described below with respect to several elements within the passive device identifier 214 that are generally representative of computer-executable instructions for performing different operations (e.g., submodules). Among other elements, the passive device identifier 214 includes a dataset generator 230 that generates a dataset of current-voltage pairs by incrementally ramping up current supplied to a current source 232 of the headset 204 at discrete intervals and controlling a voltage sampler 236 to sample a voltage of the headset 204 at each one of the discrete intervals during the ramp. In FIG. 2, the voltage sampler 236 samples a voltage that is then passed through an analog-to-digital converter 238 and provided to a line fit engine 234 of the passive device identifier 214. The output of the analog-to-digital converter 238 that is received by the line fit engine 234 is assumed to be linearly proportional to the corresponding analog voltage. In one implementation, values of the current selected for the ramp are below the audible range of current for the headset 204 to ensure that the above-described ramping and current sampling is not audibly detectable to a user. For example, the current ramp may assume values between 0 and 300 µA where voltage is sampled at increments of 10 µA during the ramp.

After the dataset generator 230 has generated a dataset of current-voltage pairs including at least threshold number of data points (e.g., 10), the line-fit engine 234 fits a line to the dataset, where the slope of the line (referred to herein as "Beta") represents the change in the measured digital voltage relative to the incremental change in the current between each data point. Although several different line-fitting techniques may be suitable and employed in different implementations, one implementation of the line fit engine 234 utilizes a least squares linear regression to identify a best-fit line, which is of the form Y=Alpha+Beta (x).

In one implementation that utilizes a least linear squares regression technique, Alpha is derived by sampling output of the analog-to-digital converter 238 at a known input current.

The slope Beta is given by equation (1), below:

$$\text{Beta} = (nS_{xy} - S_x S_y)/(nS_{xy} - S_x^2) \quad (1)$$

where n is the number of points in the generated dataset, and $S_x$, $S_y$, $S_{xy}$, $S_{yy}$, and $S_{xx}$ are given by equations 2-6, below:

$$S_x = \sum_{i=1}^{n} y \quad (2)$$

$$S_y = \sum_{i=1}^{n} y \quad (3)$$

$$S_{xy} = \sum_{i=1}^{n} x * y \quad (4)$$

$$S_{yy} = \sum_{i=1}^{n} y^2 \quad (5)$$

$$S_{xx} = \sum_{i=1}^{n} x^2 \quad (6)$$

FIG. 2 illustrates a plot 246 of an example dataset with current values along the x-axis and output of the analog-to-digital converter 238 along the y-axis. A best fit line 248 for the dataset has a slope (Beta) can be calculated according to equation (1), above.

After the line fit engine 234 calculates the slope (Beta) of the best fit line, a confidence calculator 240 executes operations to determine whether the generated dataset has enough points to guarantee a threshold confidence (e.g., 95% confidence) in a desired result. For example, the desired result may be a standard deviation in the calculated slope that is less than some deviation threshold, such as 10%. In one implementation, the confidence calculator 240 calculates the standard deviation of Beta for the dataset according to equation (7), below:

$$\sigma = \sqrt{\left(\frac{nS_{yy} - S_y^2 - \text{Beta}^2(nS_{xx} - S_x^2)}{n(n-2)}\right)} \quad (7)$$

Confidence estimation may be performed in various ways. In one implementation, the confidence calculator 240 is preprogrammed with a value of the ratio Beta/σ that is deemed mathematically sufficient to provide the threshold confidence in the desired result. For example, a Beta/σ representative of a 95% confidence that the standard deviation error is less than 10% can be solved for using equation (8) below:

$$\% \text{ Error} = (\text{Beta} - (t13*\sigma))/\text{Beta} \quad (8)$$

where the % Error represents accuracy in the measured slope (Beta) with respect to the actual slope and t13 represents a probability distribution (e.g., a t-distribution) generally representative of a conservative estimate of a number of variables represented by the distribution. It can be appreciated that other probability distributions may also be suitable for calculating error in the slope (Beta), including those with greater and/or fewer degrees of freedom depending on variations in error margin acceptability for different design implementations.

To solve for Beta/σ in Equation (8), above, the value of t13 can be looked up in t-distribution table. For example, a t-distribution representing 13 degrees of freedom (t13) has a 0.975 quantile value of 2.1604. Therefore, if a standard deviation of less than 10% is desired, 0.90 can be plugged in for the % Error value and the ratio of Beta/σ can be solved for, yielding 21.604. In other words, when the ratio of Beta/σ is greater than 21.604, there exists a 95% confidence that the standard deviation (σ) of Beta is less than 10%.

If this pre-computed ratio of Beta/σ is saved in the memory 212, the confidence calculator 240 can, at each iteration of the current ramping and voltage sampling, calculate a Beta/σ and compare the computed value to the saved value. When the computed value is less than the saved value, the confidence calculator 240 determines that the dataset is insufficient to guarantee the threshold confidence in the desired result and instructs the dataset generator 230 to again increment the current supplied to the headset 204 and to sample the voltage of the headset 204 at the incremented current value. After the dataset generator 230 adds this new current-voltage pair to the previously-generated dataset, the line fit engine 234 iteratively adjusts both the slope (Beta) of the best fit line 248 and the standard deviation (e.g., by expanding the summations included in equations (1) and (7) above), and determines whether the new ratio of Beta/σ indicates that the dataset is sufficient to guarantee the threshold confidence in the desired result.

These steps (e.g., current incrementation, voltage sampling, line fitting, and confidence calculation) are repeated until the confidence calculator 240 determines that the generated dataset is large enough to provide the threshold confidence in the desired result. In this sense, the number of discrete intervals ultimately included in the dataset depends on the amount of error measured in the dataset.

Once the confidence calculator 240 determines that the dataset is sufficient to guarantee the threshold confidence in the desired result, an impedance calculator 242 calculates impedance in the headset 204 based on the calculated slope of the best-fit line (Beta). In the illustrated implementation, a linear adjustment to Beta is performed to account for an offset introduced by the analog to digital converter 238. For example, the actual impedance of the headset 204 may be given by R, where R=K(Beta) and K is a constant introduced by the analog-to-digital conversion. In one implementation, the value of K is empirically determined and utilized by the impedance calculator 242 to solve for the actual impedance.

The above-described operations may be performed separately with respect to the left channel 224 and the right channel 226 of the headset 204. Once impedance is calculated via this methodology, an impedance comparator 244 compares the calculated impedance to values stored in a device impedance index 228, where each stored impedance value is further associated with a specific type of device, such as a mono headset, a 32 ohm stereo headset, and a 16 ohm stereo headset, etc. The impedance comparator 244 identifies the headset 204 by selecting the type of device that is associated with the saved impedance value(s) closest to the calculated impedance value(s). This information identifying the headset 204 (or other type of passive device) can be used in a variety of ways, such as to initially enable audio, enable different features of audio streaming, and/or to implement one or more gain adjustments.

In one implementation, the impedance comparator 244 provides this information identifying the headset 204 and/or associated saved impedance value(s) to the gain adjuster 216. Responsive to receipt of such information, the gain adjuster 216 accesses a device gain adjustment index 246 (e.g., a table), selects a gain adjustment associated with the identified type of device, and implements the selected gain adjustment. For example, the gain adjuster 216 selects and implements a gain adjustment that is specifically tuned to provide an intended experience to a user wearing a 32 Ohm dual-channel stereo headset.

Figure 3:
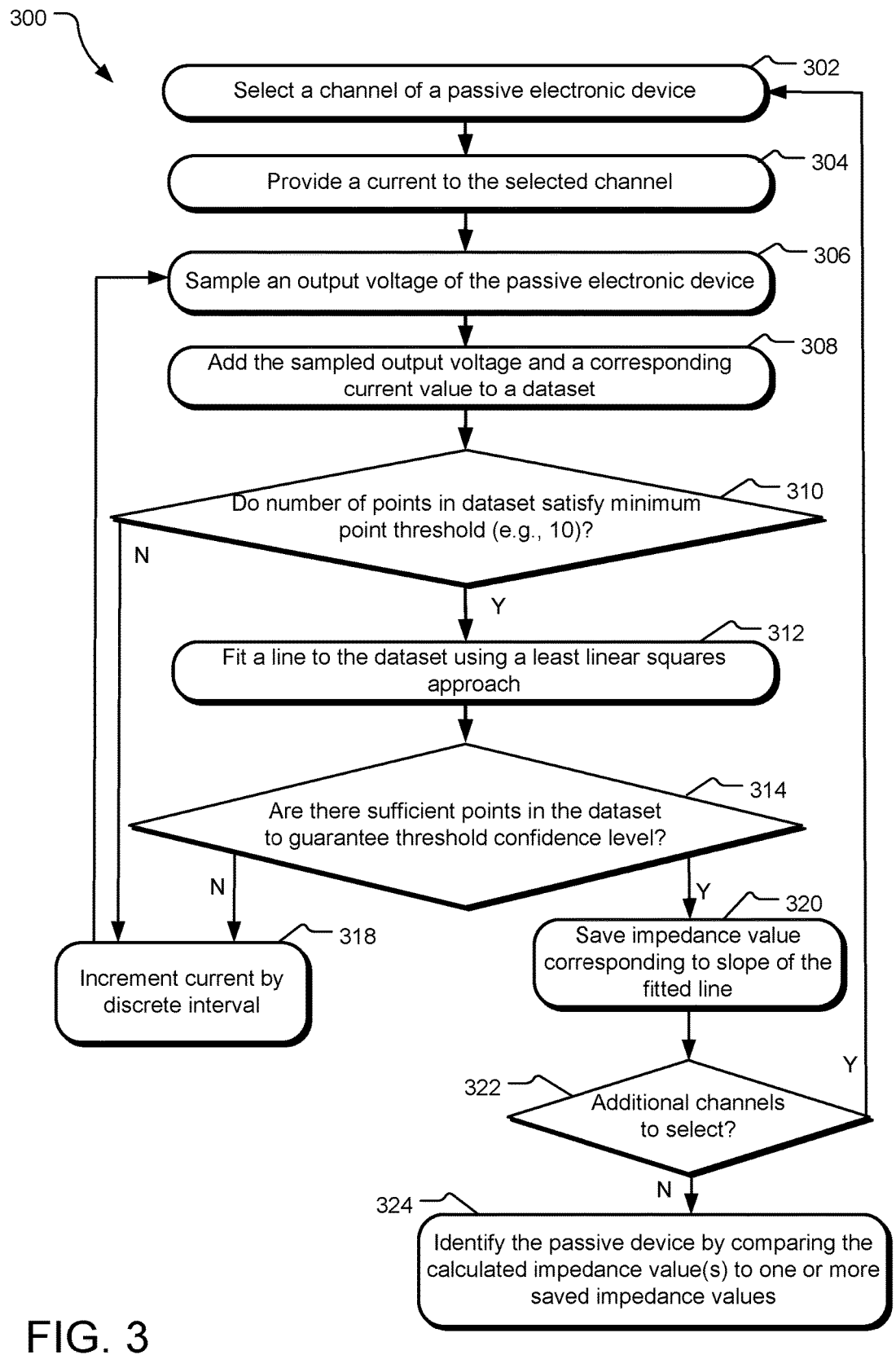
FIG. 3 illustrates example operations for passive device detection.

FIG. 3 illustrates example operations for passive device detection. A channel selection operation 302 selects a first channel of the passive electronic device for an impedance measurement. A current provision operation 304 provides a current to the selected channel at an initial current value, and a voltage sampling operation 306 samples an output voltage of the passive electronic device while the current is provided at the initial current value. A dataset compiling operation 308 updates a null dataset to add a two-dimensional data point defined by the sampled voltage and the associated initial current level.

Responsive to the dataset compiling operation 308, a determination operation 312 determines whether a number of points in the updated dataset is sufficient to satisfy some minimum point threshold, such as 10 data points. If the updated dataset does not yet include a number of points sufficient to satisfy the minimum point threshold, a current incrementing operation 318 increments the supplied current by a discrete interval, and the sampling operation 306 samples the voltage at the incremented current value. The dataset compiling operation 308 updates the dataset to include another data point defined by the incremented current and corresponding voltage sample. Responsive to the dataset compiling operation 308, the determination operation 310 again determines whether a number of points in the updated dataset is sufficient to satisfy the minimum point threshold. The operations 318, 304, 306, 308, and 310 are repeated until the determination operation 310 determines that the number of points in the updated dataset satisfy the minimum point threshold.

Once the dataset includes the threshold minimal number of data points, a line fitting operation 312 uses a least linear squares technique to fit a line to the dataset where x-values of the dataset are the current values, y-values of the dataset are the voltage values, and the slope (y/x) of the best-fit line is given according to equation (1), above, where Beta is the slope. A determination operation 314 determines whether there exist a sufficient number of points in the dataset to guarantee a threshold confidence in a desired result. For example, the determination operation 314 may determine whether a 10% standard deviation in the slope of the fitted line can be guaranteed with a 95% confidence level.

When the determination operation 314 determines that there does not yet exist a sufficient number of points in the dataset to mathematically guarantee the threshold confidence level in the desired result, the current incrementation operation 318 again increments the current supplied to the passive electronic device by a discrete interval, and the operations 308, 310, 312, and 314 are repeated until the determination operation 314 determines that the number of data points in the dataset is sufficient to mathematically guarantee the threshold confidence level in the predefined desired result.

When the determination operation 314 does determine that the number of data points is sufficient, an impedance saving operation 320 saves an impedance value corresponding to the slope of the most recent best-fit line. This value represents the measured impedance in the currently-selected channel of the passive electronic device.

A channel selection operation 322 determines whether any additional channels exist in the passive electronic device that have not yet been subjected to impedance measurement. If one or more additional channels do exist, the channel selection operation 302 selects the additional channel and the operations 304, 306, 308, 310, 312, 314, 318, and 320 are repeated to measure and save the impedance value for the additional channel. Once impedance has been measured and saved in association with each channel of the passive electronic device, an identification operation 324 identifies the passive device by comparing the calculated impedance value for each channel to pre-calculated impedance values or value ranges stored in memory. These ranges may be associated in the memory with various device identifiers representing different types of passive electronic devices and/or associated with one or more gain adjustment values, such as via a gain adjustment table. The identification operation 324 selects the device identifier saved in association with the impedance values that are closest to the calculated values. In some implementations, the selected device identifier and/or the associated saved impedance values are utilized to select an appropriate gain adjustment of one or more signals provided to the passive electronic device and/or to implement one or more audio-streaming features.

Figure 4:
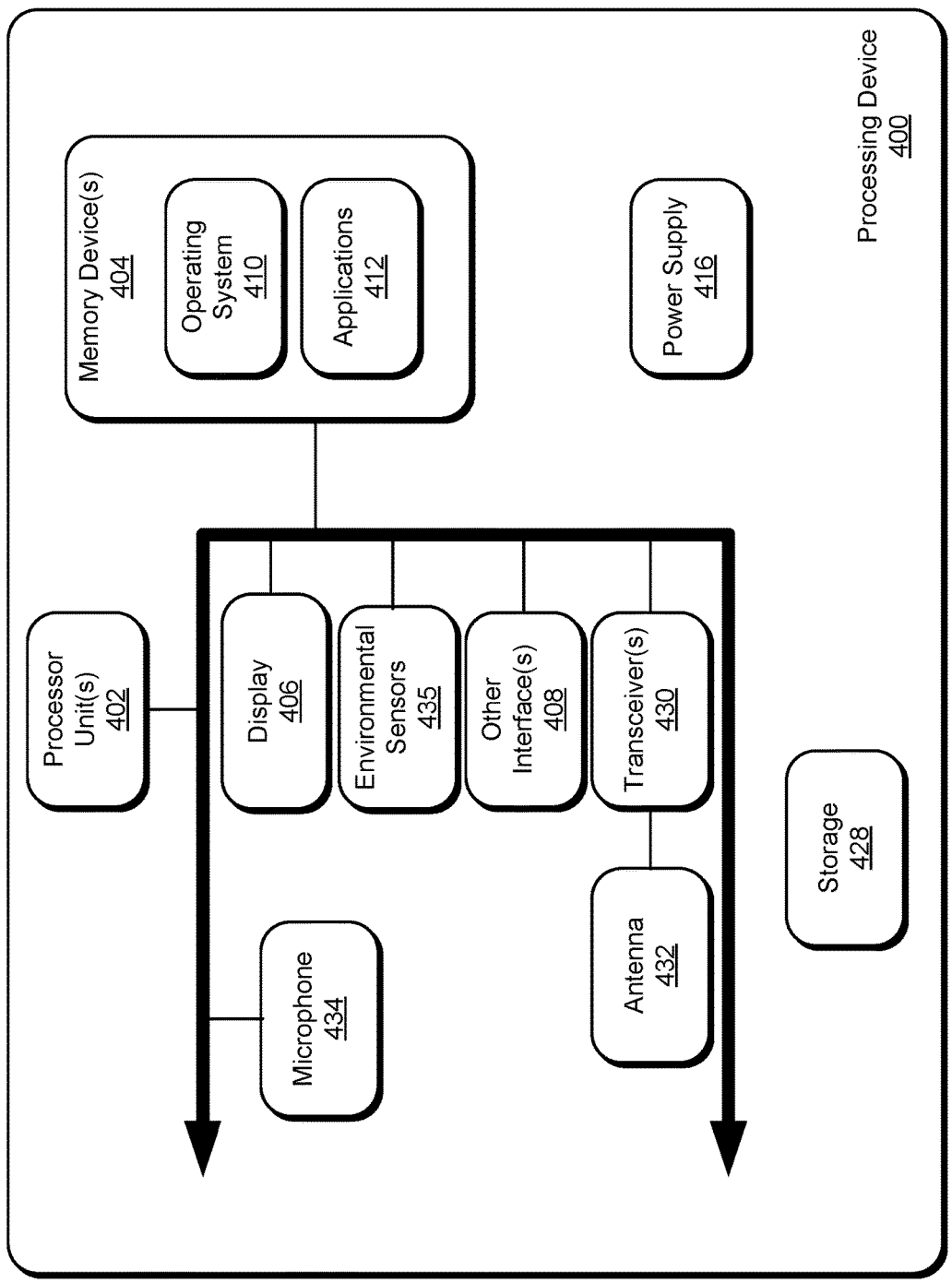
FIG. 4 illustrates an example schematic of a processing device suitable for performing the herein-described passive device identification techniques

FIG. 4 illustrates an example schematic of a processing device 400 suitable for performing the herein-described passive device identification techniques. The example processing device 400 includes one or more processor units 402, one or more memory devices 404, a display 406, and other interfaces 408 (e.g., buttons). The memory 404 generally includes both volatile memory (e.g., RAM) and non-volatile memory (e.g., flash memory). An operating system 410, such as the Microsoft Windows® operating system, the Microsoft Windows® Phone operating system or a specific operating system designed for a gaming device, resides in the memory 404 and is executed by the processor unit(s) 402, although it should be understood that other operating systems may be employed.

One or more applications 412, such as a passive device identifier or gain adjuster is loaded in the memory device 404 and executed on the operating system 410 by the processor(s) 402. The applications 412 may receive input from the display 406 and/or a and/or environmental sensors 735 (e.g., an accelerometer, touch sensors, imaging sensors, proximity sensors) embedded within the processing device 400. The example processing device 400 includes a power supply 416, which is powered by one or more batteries or other power sources and which provides power to other components of the processing device 400. The power supply 416 may also be connected to an external power source that overrides or recharges the built-in batteries or other power sources.

The processing device 400 includes one or more communication transceivers 430 and an antenna 432 to provide network connectivity (e.g., a mobile phone network, Wi-Fi®, BlueTooth®, etc.). The processing device 400 may also include various other components, such as a positioning system (e.g., a global positioning satellite transceiver), one or more accelerometers, one or more cameras, an audio interface (e.g., a microphone 434, an audio amplifier and speaker and/or audio jack), and additional storage 428. Other configurations may also be employed.

In an example implementation, a mobile operating system, various applications (including a stylus position detection engine) and other modules and services may be embodied by instructions stored in memory 404 and/or storage devices 428 and processed by the processing unit(s) 402. The memory 404 may be memory of host device or of an accessory that couples to a host.

The processing device 400 may include a variety of tangible processor-readable storage media and intangible processor-readable communication signals. Tangible processor-readable storage can include both volatile and nonvolatile storage media, removable and non-removable storage media. Tangible processor-readable storage media excludes intangible and transitory communications signals and includes volatile and nonvolatile, removable and non-removable storage media implemented in any method or technology for storage of information such as computer readable instructions, data structures, program modules or other data. Tangible processor-readable storage media includes, but is not limited to, RAM, ROM, EEPROM, flash memory or other memory technology, CDROM, digital versatile disks (DVD) or other optical disk storage, magnetic cassettes, magnetic tape, magnetic disk storage or other magnetic storage devices, or any other tangible medium which can be used to store the desired information and which can be accessed by the processing device 400. In contrast to tangible processor-readable storage media, intangible processor-readable communication signals may embody computer readable instructions, data structures, program modules or other data resident in a modulated data signal, such as a carrier wave or other signal transport mechanism. The term "modulated data signal" means a signal that has one or more of its characteristics set or changed in such a manner as to encode information in the signal. By way of example, and not limitation, intangible communication signals include wired media such as a wired network or direct-wired connection, and wireless media such as acoustic, RF, infrared and other wireless media.

Some embodiments may comprise an article of manufacture. An article of manufacture may comprise a tangible storage medium to store logic. Examples of a storage medium may include one or more types of processor-readable storage media capable of storing electronic data, including volatile memory or non-volatile memory, removable or non-removable memory, erasable or non-erasable memory, writeable or re-writeable memory, and so forth. Examples of the logic may include various software elements, such as software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. In one embodiment, for example, an article of manufacture may store executable computer program instructions that, when executed by a computer, cause the computer to perform methods and/or operations in accordance with the described embodiments. The executable computer program instructions may include any suitable type of code, such as source code, compiled code, interpreted code, executable code, static code, dynamic code, and the like. The executable computer program instructions may be implemented according to a predefined computer language, manner or syntax, for instructing a computer to perform a certain function. The instructions may be implemented using any suitable high-level, low-level, object-oriented, visual, compiled and/or interpreted programming language.

An example system includes memory, a processor, and a passive device identifier stored in the memory and executable by the processor to increment a current supplied to a passive electronic device at discrete intervals and to sample a voltage of the passive electronic device at each one of the discrete intervals to generate a dataset of current-voltage pairs. Using the generated dataset, the passive device identifier is further executable to identify the passive electronic device.

In another example system of any preceding system, the number of discrete intervals represented by the dataset depends on an amount of error measured in the dataset.

In another example system of any preceding system, the passive device identifier identifies the passive electronic device based on a slope of a line fitted to the dataset.

In another example system of any preceding system, the passive device identifies the passive electronic device by comparing the slope of the fitted line to a plurality of impedance values each saved in memory in association with a different one of a plurality of passive electronic devices.

In still another example system of any preceding system, the slope is calculated responsive to the voltage sampling at each of the discrete intervals using a least squares linear regression technique.

In another example system of any preceding system, the passive device identifier is further executable to estimate a confidence in accuracy of a calculation of the slope and perform the identification responsive to a determination that the estimated confidence satisfies a threshold.

In another example system of any preceding system, the passive device detector is further executable to repeat the incrementation and the sampling operations responsive to a determination that the estimated confidence does not satisfy the threshold.

In another example system of any preceding system, the system further includes a gain adjuster that adjusts gain in the passive electronic device based on the identification.

A example method includes incrementing a current supplied to a passive electronic device at discrete intervals, sampling a voltage at each one of the discrete intervals to generate a dataset of current-voltage pairs, and identifying the passive electronic device based on the generated dataset.

In an example method of any preceding method, the number of discrete intervals represented by the dataset depends on an amount of error measured in the dataset.

In another example method of any preceding method, the passive device identifier identifies the passive electronic device based on a slope of a line fitted to the dataset.

In yet another example method of any preceding method, the passive device identifier identifies the passive electronic device based on a slope of a line fitted to the dataset.

In another example method of any preceding method, the method further includes estimating a confidence in accuracy of a calculation of the slope; and performing the identification responsive to a determination that the estimated confidence satisfies a threshold.

In still another example method of any preceding method, the method further includes repeating the incrementation and the sampling operations responsive to a determination that the estimated confidence does not satisfy the predefined acceptable error margin.

In another example method of any preceding method, the slope is calculated responsive to the voltage sampling at each of the discrete intervals using a least squares linear regression technique.

In another example method of any preceding method, the method further includes adjusting gain in the passive electronic device based on the identification.

A example system includes a means for incrementing a current supplied to a passive electronic device at discrete intervals, and a means for sampling a voltage at each one of the discrete intervals to generate a dataset of current-voltage pairs. The system further includes a means for identifying the passive electronic device based on the generated dataset.

One or more example tangible processor-readable storage media of a tangible article of manufacture includes computing-executable instructions for executing on a computer a computer process that includes incrementing a current supplied to a passive electronic device at discrete intervals, sampling a voltage at each one of the discrete intervals to generate a dataset of current-voltage pairs, and identifying the passive electronic device based on the generated dataset.

In another example tangible processor-readable storage media of any preceding processor-readable storage media, identifying the passive electronic device further includes identifying the passive electronic device based on a slope of a line fitted to the dataset.

In yet another example tangible processor-readable storage media of any preceding processor-readable storage media, the slope is calculated responsive to the voltage sampling at each of the discrete intervals using a least linear regression technique.

In yet another example tangible processor-readable storage media of any preceding processor-readable storage media, the computer process further includes adjusting gain in the passive electronic device based on the identification.

The above specification, examples, and data provide a complete description of the structure and use of exemplary implementations. Since many implementations can be made without departing from the spirit and scope of the claimed invention, the claims hereinafter appended define the invention. Furthermore, structural features of the different examples may be combined in yet another implementation without departing from the recited claims.

What is claimed is:

1. A system comprising:
   memory;
   a processor;
   a passive device identifier stored in the memory and executable by the processor to:
      increment a current supplied to a passive electronic device at discrete intervals;
      sample a voltage of the passive electronic device at each one of the discrete intervals to generate a dataset of current-voltage pairs; and
      identify the passive electronic device based on the generated dataset.

2. The system of claim 1, wherein the number of discrete intervals represented by the dataset depends on an amount of error measured in the dataset.

3. The system of claim 1, wherein the passive device identifier identifies the passive electronic device based on a slope of a line fitted to the dataset.

4. The system of claim 3, wherein the passive device identifier identifies the passive electronic device by comparing the slope of the fitted line to a plurality of impedance values each saved in memory in association with a different one of a plurality of passive electronic devices.

5. The system of claim 3, wherein the slope is calculated responsive to the voltage sampling at each of the discrete intervals using a least squares linear regression technique.

6. The system of claim 3, wherein passive device identifier is further executable to:
   estimate a confidence in accuracy of a calculation of the slope; and
   perform the identification responsive to a determination that the estimated confidence satisfies a threshold.

7. The system of claim 6, wherein the passive device identifier is further executable to repeat the incrementation and the sampling operations responsive to a determination that the estimated confidence does not satisfy the threshold.

8. The system of claim 1, further comprising:
   a gain adjuster stored in memory and executable by a processor to adjust gain in the passive electronic device based on the identification.

9. A method comprising:
   incrementing a current supplied to a passive electronic device at discrete intervals;
   sampling a voltage at each one of the discrete intervals to generate a dataset of current-voltage pairs; and
   identifying the passive electronic device based on the generated dataset.

10. The method of claim 9, wherein the number of discrete intervals represented by the dataset depends on an amount of error measured in the dataset.

11. The method of claim 9, wherein identifying the passive electronic device further comprises: identifying the passive electronic device based on a slope of a line fitted to the dataset.

12. The method of claim 11, further comprising:
    estimating a confidence in accuracy of a calculation of the slope; and
    performing the identification responsive to a determination that the estimated confidence satisfies a threshold.

13. The method of claim 12, further comprising:
    repeating the incrementation and the sampling operations responsive to a determination that the estimated confidence does not satisfy the threshold.

14. The method of claim 11, wherein the slope is calculated responsive to the voltage sampling at each of the discrete intervals using a least squares linear regression technique.

15. The method of claim 9, further comprising:
    adjusting gain in the passive electronic device based on the identification.

16. One or more tangible processor-readable storage media of a tangible article of manufacture encoding computer-executable instructions for executing on a computer system a computer process, the computer process comprising:
    incrementing a current supplied to a passive electronic device at discrete intervals;
    sampling a voltage at each one of the discrete intervals to generate a dataset of current-voltage pairs; and
    identifying the passive electronic device based on the generated dataset.

17. The one or more tangible processor-readable storage media of claim 16, wherein the number of discrete intervals represented by the dataset depends on an amount of error measured in the dataset.

18. The one or more tangible processor-readable storage media of claim 16, wherein identifying the passive electronic device further comprises:
    identifying the passive electronic device based on a slope of a line fitted to the dataset.

19. The one or more tangible processor-readable storage media of claim 18, wherein the slope is calculated responsive to the voltage sampling at each of the discrete intervals using a least squares linear regression technique.

20. The one or more tangible processor-readable storage media of claim 16, further comprising:
    adjusting gain in the passive electronic device based on the identification.

* * * * *